United States Patent [19]

Grancharov et al.

[11] 4,162,170
[45] Jul. 24, 1979

[54] METHOD OF OBTAINING GRANULATED AND DEFLUORATED PHOSPHOGYPSUM

[75] Inventors: Ivan N. Grancharov; Fanka D. Tudjarova; Yovka P. Bakalova; Yoncho G. Pelovski; Nikola B. Videnov; Ivan P. Dombalov, all of Sofia, Bulgaria

[73] Assignee: Vish Chimiko-Technologicheski Institute, Sofia, Bulgaria

[21] Appl. No.: 937,091

[22] Filed: Aug. 28, 1978

Related U.S. Application Data

[63] Continuation of Ser. No. 810,985, Jun. 29, 1977, abandoned.

[51] Int. Cl.$^2$ ............................................. C04B 11/00
[52] U.S. Cl. .................................... 106/109; 423/171; 423/555
[58] Field of Search ..................... 106/109, 110, 111; 423/170, 555, 171

[56] References Cited

U.S. PATENT DOCUMENTS 2,230,211  1/1941  Dailey ................................ 106/110
3,547,581  12/1970  Gauster et al. ..................... 423/555

FOREIGN PATENT DOCUMENTS 445983  1/1948  Canada ..................................... 423/170

Primary Examiner—James Poer
Attorney, Agent, or Firm—Karl F. Ross

[57] ABSTRACT

A combined method for granulation and defluoration of phosphogypsum, suitable for subsequent fluidized bed disassociation to lime and sulphur dioxide is described. The new phosphogypsum, obtained from phosphoric acid production, containing residual combined fluorine, is dried to reduce its residual water. It is moistened with sulfuric acid and aqueous solutions of binding agent additives and then granulated. The granules are heat-treated at temperatures between 170° C. and 700° C. During the heat treatment the residual fluorine residue is volatilized and the granules increase in strength sufficient for use in subsequent fluidized bed treatments.

5 Claims, No Drawings

METHOD OF OBTAINING GRANULATED AND DEFLUORATED PHOSPHOGYPSUM

This is a continuation of application Ser. No. 810,985, filed 29 June 1977, now abandoned.

This method is related to the obtaining or granulated and defluorated phosphogypsum.

There is a well-known method, related to the defluoration of gypsum alone, according to which, first of all a full separation of the free water is implemented (drying) and a partial or full separation of the crystalline water during the heating process, then, after the addition of sulphuric acid and at a novel heating at 200° to 500° C. the defluoration itself occurs. The main drawback of the method lies in the necessity of a full drying of the phosphogypsum and the separation or a part or of the whole quantity of the water, which is chemically bound with gypsum, what in turn is connected with elevated power-expenditures. Besides that, the method features a major drawback in that polydispersed & defluorated phosphogypsum is obtained, which is merely unsuitable for thermal treatment in general and in fluid bed specifically.

The scope of the invention is to elaborate a method of obtainment of granulated & defluorated phosphogypsum, suitable for thermal treatment/or processing, as well as of gas, free of fluoric compounds.

This goal is reached by the following way:

The humid phosphogypsum is submitted to a preliminary drying at 100° to 150° C., unless a residual moisture-content of 0.5 to 10 percent is reached. Then, the same phosphogypsum is granulated at simultaneous introduction of sulphuric acid and binding additives. The concentration of the sulphuric acid is in the range of 55 to 98% and in such a form it is added, i.e. 0.5 to 15 weight parts to a batch of 100 weight parts of dried phosphogypsum. As a binding additive one can use carbamide, ammonium nitrate, tylose, calcium nitrate, polyethylene oxide and distillating fluid from the soda-production which are introduced in quantities, ranging from 0.01 to 6 percent. With the addition of sulphuric acid and binding additives, some water, necessary for the granulation of the phosphogypsum is also added. The humid granules are submitted to a thermal processing at 170° to 700° C. for 15 to 120 minutes, wherein they are dried, mechanically-strengthened and finally defluorated. The main fluorine-content of the output phosphogypsum is separated during the process of granulation and drying of the humid granules.

The so obtained defluorated and granulated phosphogypsum meets all the requirements for a further thermal processing in a fluid bed, wherein a gas, non-containing fluoric compounds is obtained, and out of which the corresponding sulphuric acid can be easily produced.

The method, according to the invention, can be better illustrated by the following example: A certain amount of phosphogypsum, containing 3.70% of $P_2O_5$, 0.44% of F and 42.3% of moisture is dried at 110° C. unless a free residual moisture of 3.5% is reached. In the volume of a drum-type granulator, containing 100 weight parts of dried phosphogypsum are inserted 13 weight parts of a 90% sulphuric acid-solution and 3 weight parts of water-diluted carbamide in order to obtain an overall humidity of the mass, equal to 21%. The granulation process takes 4 min. at a rotation speed of the drum equal to 40 r.p.m. The so obtained granules are dried at 170° C. during 60 min, resulting in a fluor-content of 0.07%. At an additional thermal processing of these granules at 450° C. for 25 minutes, the fluor-content falls to 0.02%.

The method proposed herewith, features a great deal of advantages over the known methods of phosphogypsum-defluoration. It permits a high rate of the defluoration to be achieved, partically up to a full separation of fluor, with a possibility of controlling the desired rate of defluoration. The process features simplicity and easiness of implementing of a large number of operations regarding the phosphogypsum process, makes possible a better blending of the phosphogypsum with the sulphuric acid-additive, combined with a simultaneous granulation of the mixture, hence—to a better defluoration.

The binding substances and the sulphuric acid used here are cheap and attainable, i.e. almost constantly available, and the simultaneous mixing and granulation allows their insertion in the form of aqueous solutions together with the necesaary for the granulation process water-amount, this making opportune the additional metering and mixing of said additives with phosphogypsum.

At the preliminary-drying stage of phosphogypsum, according to the present method, a full separation of free moisture is not foreseen (this also regards the part of chemically-bound water), but only a part of said free-moisture is separated in order to secure the proper granulation of the material.

In accordance with all yet known methods of phosphogypsum-defluoration, polydispersion is obtained-a mostly powderlike material, utterly unfit for any further processing in fluid-bed apparatus. When reprocessed in other equipments, the latter causes a large dusting of the gas and a considerable dust-ablation. The method proposed, combines the defluoration with granulation and besides that ensures the obtaining of granulated and defluorated phosphogypsum, which is very suitable for a further reprocessing, particularly in the highly intensive, and more and more used fluid-bed apparatus. The defluorated and granulated phosphogypsum obtained by this method is particularly suitable for a thermal reprocessing into lime and gas in fluid-bed furnaces. The gas,—containing sulphur dioxide, is wherefrom sulphuric acid can be easily obtained.

What we claim is:

1. A method for the production of granulated and defluorated phosphogypsum for thermal processing which comprises the steps of:
   (a) preliminarily drying phosphogypsum, from phosphoric acid manufacture, to a residual moisture content of from 0.5 to 10 percent;
   (b) mixing said preliminarily dried phosphogypsum with sulfuric acid of concentration range 55 to 98%, and granulation-binding additives, in solution, said sulfuric acid being added in amounts of from 0.5 to 15 weight parts and said binding additives being added in amounts of from 0.01 to 6 weight parts per 100 parts of said phosphogypsum, said binding additives being selected from the group consisting of carbamide, ammonium nitrate, carboxymethylcellulose, calcium nitrate, polyethylene oxide and the distillation fluids from soda production;
   (c) granulating said mixture; and
   (d) then heating the granules to a temperature in the range of 170° C. to 700° C. to drive off fluorine-containing gases and to strengthen said granules for subsequent thermal processing in fluidized beds.

2. The method according to claim 1 wherein said solutions of said additives contain sufficient water to provide a liquid content sufficient for granulation of said mixture.

3. The method according to claim 1 wherein said granules in step (d) are heated for from 15 to 120 minutes.

4. The method according to claim 1 wherein said phosphogypsum in step (a) is air dried to a residual moisture content of substantially 3.5 percent; then 13 weight parts of 90% sulfuric acid and 3 weight parts of carbamide, in sufficient water to provide a 21% moisture content, is added per 100 parts of dried phosphogypsum to provide a granulation mixture; and after granulation the granules are heated for 60 minutes at 170° C. to provide phosphogypsum granules having a fluorine content of substantially 0.07 percent.

5. The method according to claim 4 wherein said granules with fluorine content of substantially 0.07 percent are further heated at 450° for 25 minutes to reduce their fluorine content to 0.02 percent.

* * * * *